(12) United States Patent
Won et al.

(10) Patent No.: US 9,437,858 B2
(45) Date of Patent: Sep. 6, 2016

(54) LEAD TAP, BATTERY PACK HAVING THE LEAD TAP AND METHOD OF MANUFACTURING THE LEAD TAP

(71) Applicant: SAMSUNG SDI CO., LTD., Yongin-si, Gyeonggi-do (KR)

(72) Inventors: Hee-Youn Won, Yongin-si (KR); Dae-Yon Moon, Yongin-si (KR)

(73) Assignee: Samsung SDI., Ltd., Yongin-si (KR)

( * ) Notice: Subject to any disclaimer, the term of this patent is extended or adjusted under 35 U.S.C. 154(b) by 325 days.

(21) Appl. No.: 13/691,705

(22) Filed: Nov. 30, 2012

(65) Prior Publication Data

US 2014/0072858 A1  Mar. 13, 2014

(30) Foreign Application Priority Data

Sep. 11, 2012 (KR) .................. 10-2012-0100663

(51) Int. Cl.
*H01M 2/20* (2006.01)
*H01M 2/22* (2006.01)
*H01M 2/02* (2006.01)
*H01M 2/04* (2006.01)
*H01M 2/30* (2006.01)
*H01M 2/10* (2006.01)

(52) U.S. Cl.
CPC .......... *H01M 2/202* (2013.01); *H01M 2/0404* (2013.01); *H01M 2/22* (2013.01); *H01M 2/021* (2013.01); *H01M 2/0212* (2013.01); *H01M 2/0215* (2013.01); *H01M 2/0277* (2013.01); *H01M 2/0469* (2013.01); *H01M 2/0482* (2013.01); *H01M 2/1061* (2013.01); *H01M 2/30* (2013.01); *H01M 2200/10* (2013.01)

(58) Field of Classification Search
None
See application file for complete search history.

(56) References Cited

U.S. PATENT DOCUMENTS

| | | | | |
|---|---|---|---|---|
| 6,822,420 | B2* | 11/2004 | Kozu et al. | 320/107 |
| 2005/0153195 | A1 | 7/2005 | Han | |
| 2005/0153583 | A1* | 7/2005 | Kawamura et al. | 439/76.2 |
| 2005/0214597 | A1 | 9/2005 | Kim et al. | |
| 2009/0081538 | A1 | 3/2009 | Moon | |
| 2011/0039129 | A1* | 2/2011 | Lee et al. | 429/7 |
| 2011/0123838 | A1 | 5/2011 | Lee et al. | |
| 2012/0189901 | A1* | 7/2012 | Chuang | 429/158 |

FOREIGN PATENT DOCUMENTS

| | | |
|---|---|---|
| EP | 2365558 A1 | 9/2011 |
| EP | 2413400 A2 | 2/2012 |

(Continued)

OTHER PUBLICATIONS

EPO Office action dated Jan. 7, 2014, for corresponding European Patent application 13164367.8, (4 pages).

*Primary Examiner* — Jeremiah Smith
(74) *Attorney, Agent, or Firm* — Lewis Roca Rothgerber Christie LLP

(57) ABSTRACT

A lead tap that includes an insulation cover including a boss unit, which protrudes from a surface of the insulation cover and includes an electrical insulating material; and a thermal cut-off device assembly including: a thermal cut-off device; a first lead and a second lead that are coupled to the thermal cut-off device; and a hole through which a portion of the boss unit of the insulation cover protrudes. Here, the boss unit of the insulation cover includes an edge unit that is larger than an opening of the hole of the thermal cut-off device assembly to secure the insulation cover to the thermal cut-off device assembly.

10 Claims, 4 Drawing Sheets

(56) References Cited

FOREIGN PATENT DOCUMENTS

| EP | 2455996 | A2 | 5/2012 | | |
| JP | 02002343315 | | * 11/2002 | ............ | H01M 2/04 |
| KR | 10-2002-0086228 | | 11/2002 | | |
| KR | 10-2005-0087632 | A | 8/2005 | | |
| KR | 10-2009-0030710 | | 3/2009 | | |
| KR | 10-2009-0064028 | A | 6/2009 | | |
| KR | 10-2010-0041435 | A | 4/2010 | | |
| KR | 10-2010-0089124 | A | 8/2010 | | |

* cited by examiner

LEAD TAP, BATTERY PACK HAVING THE LEAD TAP AND METHOD OF MANUFACTURING THE LEAD TAP

CROSS-REFERENCE TO RELATED APPLICATION

This application claims priority to and the benefit of Korean Patent Application No. 10-2012-0100663, filed on Sep. 11, 2012, in the Korean Intellectual Property Office, the disclosure of which is incorporated herein in its entirety by reference.

BACKGROUND

1. Field

One or more embodiments of the present invention relate to lead taps, battery packs having the lead taps, and methods of manufacturing the lead taps.

2. Description of the Related Art

Portable electronic devices such as notebook computers, tablet computers, and smart phones are widely used. A portable electronic device includes a battery pack that stores electric energy so that the portable electronic device may be used for a certain period of time in a state when the portable electronic device is separated from an external power source. The battery pack may include a plurality of battery cells formed of secondary batteries that may be repeatedly charged and discharged.

Positive terminals and/or negative terminals of the battery cells may be combined with lead taps.

SUMMARY

Aspects of one or more embodiments of the present invention include lead taps that effectively prevent overheating of battery cells, a battery pack that includes the lead tap, and also, a method of manufacturing the lead tap simply and rapidly with a low manufacturing cost.

Additional aspects of the present invention may become apparent from the written description, or may be learned by practice of the presented embodiments.

According to one or more embodiments of the present invention, a lead tap includes: an insulation cover including a boss unit, which protrudes from a surface of the insulation cover and includes an electrical insulating material; and a thermal cut-off device assembly including: a thermal cut-off device; and a first lead and a second lead that are coupled to the thermal cut-off device; the thermal cut-off device assembly having a hole through which a portion of the boss unit of the insulation cover protrudes. Here, the boss unit of the insulation cover includes an edge unit that is larger than an opening of the hole of the thermal cut-off device assembly to secure the insulation cover to the thermal cut-off device assembly.

The insulation cover may have a first opening, and the first lead of the thermal cut-off device assembly may be exposed at a lower surface of the insulation cover by the first opening.

The insulation cover may have a second opening, and the thermal cut-off device of the thermal cut-off device assembly may be exposed at the lower surface of the insulation cover by the second opening.

The hole of the thermal cut-off device assembly may be located at a combining unit that extends from the second lead.

The insulation cover may include a sidewall that covers at least a portion of a periphery (e.g., a circumference) of the thermal cut-off device assembly.

According to another embodiment of the present invention, a battery pack includes: a plurality of battery cells including terminals; and a plurality of lead taps coupled with the terminals of the battery cells. Here, a lead tap of the lead taps includes: an insulation cover including a boss unit, which protrudes from a surface of the insulation cover and includes an electrical insulating material; and a thermal cut-off device assembly including: a thermal cut-off device; and a first lead and a second lead that are coupled to the thermal cut-off device, the thermal cut-off device assembly having a hole through which a portion of the boss unit of the insulation cover protrudes. The boss unit of the insulation cover includes an edge unit that is larger than an opening of the hole of the thermal cut-off device assembly to secure the insulation cover to the thermal cut-off device assembly.

A method of manufacturing a lead tap according to one or more embodiments of the present invention includes: preparing an insulation cover including a boss unit, which protrudes from a surface of the insulation cover and includes an electrical insulating material; preparing a thermal cut-off device assembly including: a thermal cut-off device; and a first lead and a second lead that are coupled to the thermal cut-off device, the thermal cut-off device assembly a hole configured to receive the boss unit of the insulation cover; arranging the thermal cut-off device assembly on the insulation cover so that the boss unit of the insulation cover is inserted into the hole of the thermal cut-off device assembly; and thermal-pressing a portion of the boss unit that protrudes through the hole of the thermal cut-off device assembly to form an edge unit of the boss unit.

The lead tap of the battery cell according to one or more embodiments of the present invention effectively prevents overheating of the battery cell. Also, according to one or more embodiments of the present invention, the lead tap may be simply and rapidly manufactured with low costs.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Aspects of the present invention will be described more fully hereinafter with reference to the accompanying drawings, in which exemplary embodiments of the present invention are shown. The present invention may, however, be embodied in many different forms and should not be construed as limited to the exemplary embodiments set forth herein. Rather, these embodiments are provided so that this disclosure will be thorough and complete, and will fully convey the scope of the invention to those of ordinary skill in the art. The present invention is defined by the scope of the appended claims and their equivalents.

The terminologies used herein are for the purpose of describing particular embodiments only and are not intended to be limiting of the inventive concept. As used herein, the singular forms "a", "an", and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, and/or components, and/or groups thereof. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Figure 1:
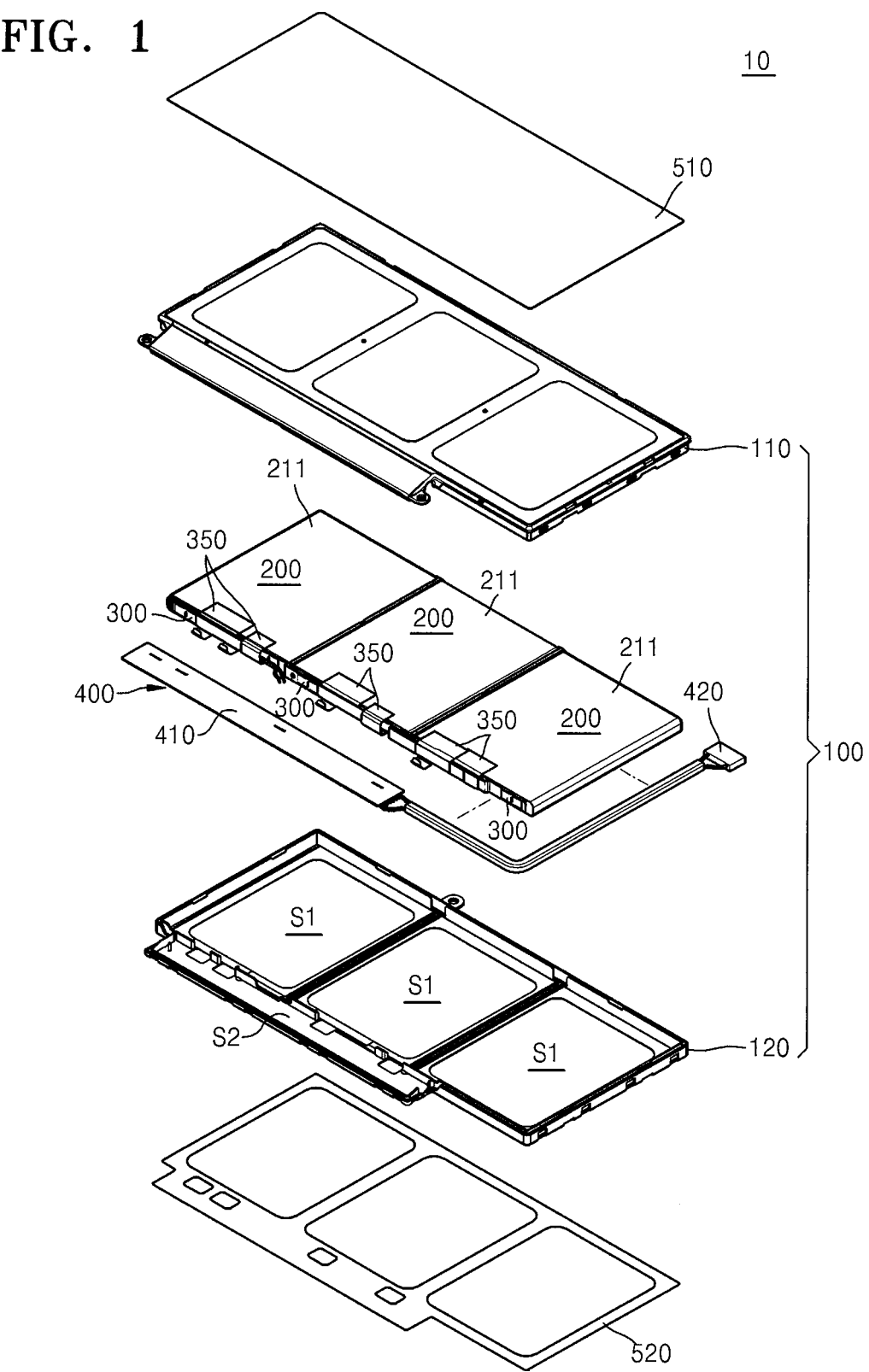
FIG. 1 is a schematic exploded perspective view showing an overall configuration of a battery pack.

FIG. 1 is a schematic exploded perspective view showing a configuration of a battery pack 10 according to an embodiment of the present invention.

Referring to FIG. 1, the battery pack 10 includes a case 100, a plurality of battery cells 200 arranged (or accommodated) in the case 100, and a protection circuit module 400.

The case 100 may include the battery cells 200 and the protection circuit module 400 arranged (e.g., disposed) therein. An external cover material of the battery cells 200 (which are arranged in the case 100) may be formed as a can 211 that includes a metal material, and, in order to avoid unnecessary electrical connection of the battery cells 200, the case 100 may also include an insulating material. For example, the case 100 may include (e.g., be made of) an injection molded plastic.

The case 100 may include an upper case 110 and a lower case 120. The upper case 110 and the lower case 120 may be coupled (e.g., connected) to each other through a hook structure formed along lateral portions thereof. The lower case 120 may include a space S1 in which the battery cells 200 may be located (e.g., be seated) and a space S2 in which the protection circuit module 400 may be located (e.g., be seated).

In order to reduce (or minimize) an overall thickness of the case 100, an upper surface of the upper case 110 corresponding to upper surfaces of the battery cells 200 or a lower surface of the lower case 120 corresponding to lower surfaces of the battery cells 200 may be formed in an opened state. An opened region of the upper case 110 and the lower case 120 may be covered by labels 510 and 520 that are respectively attached to the upper case 110 and the lower case 120.

The battery cells 200 may be, for example, rechargeable lithium-ion secondary battery cells. Each of the battery cells 200 includes an electrode assembly (not shown) and the can 211 that accommodates (e.g., receives or holds) the electrode assembly. The electrode assembly may be formed, for example, by winding in a jelly roll configuration a stack assembly including an anode plate, a cathode plate, and a separator interposed between the anode plate and the cathode plate. The can 211 may be formed of a metal material, for example, aluminum or an aluminum alloy, but is not limited thereto.

The battery cells 200 may be arranged side-by-side along a direction. For example, the battery cells 200 may be arranged parallel to each other so that a positive electrode and a negative electrode of each of the battery cells 200 are disposed on a front side. The battery cells 200 may be connected in series by lead plates 300. The lead plates 300 may be stably combined with (e.g., attached to) the battery cells 200 by a tape 350.

In the embodiment of FIG. 1, a single battery pack 10 is formed of three battery cells 200 coupled (e.g., electrically coupled or connected) in series. However, the number and the connection method of battery cells 200 that constitute the battery pack 10 are not limited thereto, but may be configured in various ways.

The protection circuit module 400 may be coupled (e.g., electrically connected) to the battery cells 200. The protection circuit module 400 may prevent (or inhibit) the battery cells 200 from overheating or exploding due to overcharging, over-discharging, or an overcurrent of the battery cells 200. The protection circuit module 400 may include a substrate 410 and a protective device (not shown) mounted on a side of or in the substrate 410. The protective device may include a passive device (such as a resistor and a capacitor), an active device (such as an electric field transistor), an integrated circuit, or combinations thereof.

A connector 420 for supplying power to an external electronic device may be included on a side of the protection circuit module 400.

Figure 2:
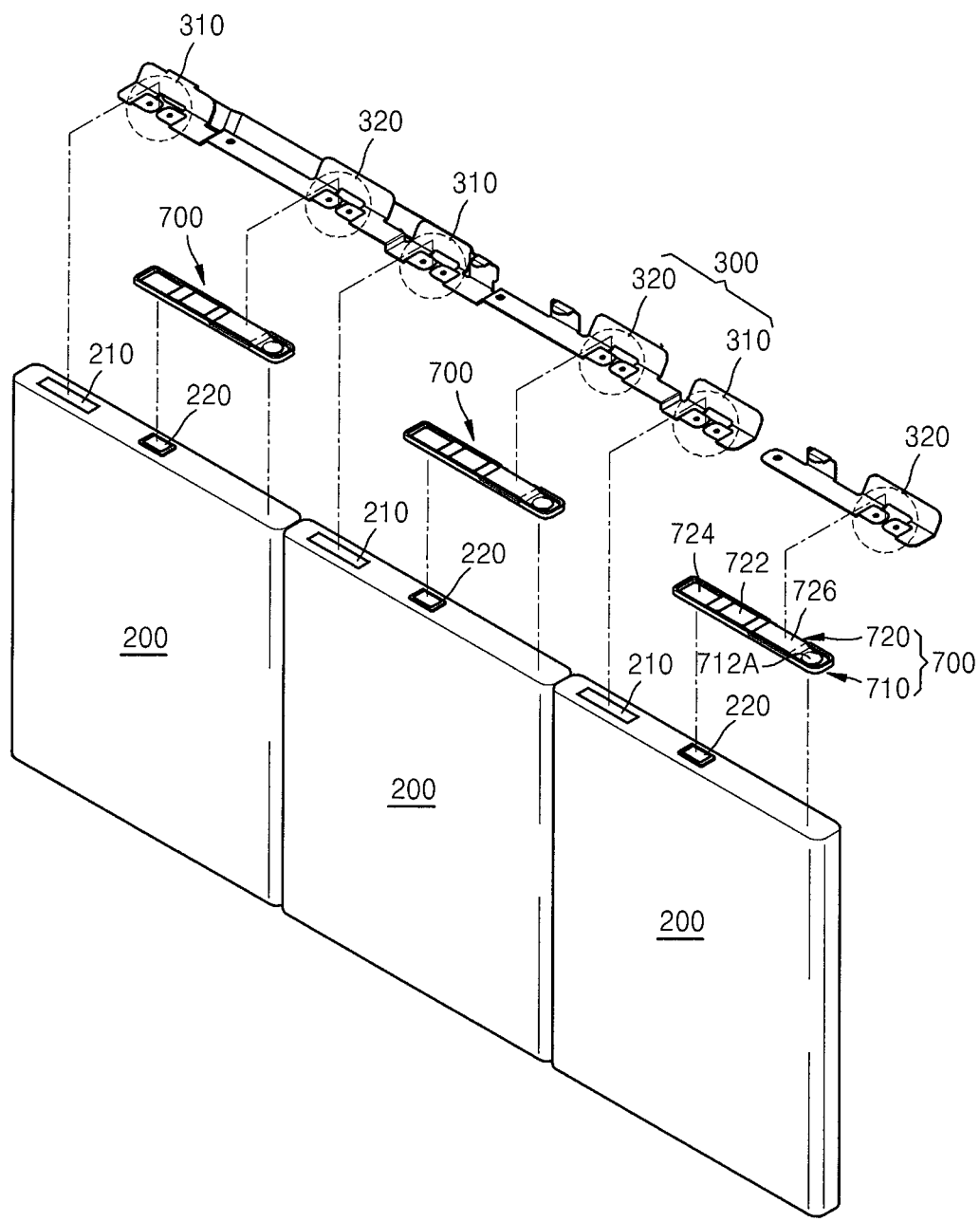
FIG. 2 is a schematic exploded perspective view showing a portion of the battery pack of FIG. 1.

FIG. 2 is a schematic exploded perspective view showing the battery cells 200, lead taps 700, and the lead plates 300 (which includes first and second connection units 310 and 320) of the battery pack 200 of FIG. 1.

Referring to FIG. 2, a positive terminal 210 and a negative terminal 220 are provided for each of the battery cells 200.

The lead tap 700 is coupled (e.g., connected) to the negative terminal 220 of the battery cell 200 and is coupled (e.g., electrically connected) to the lead plate 300. In the current embodiment, the lead tap 700 is arranged on the positive terminal 210; however, the lead tap 700 may only be arranged on the positive terminal 210 or may be arranged on both the positive terminal 210 and the negative terminal 220.

Figure 3:
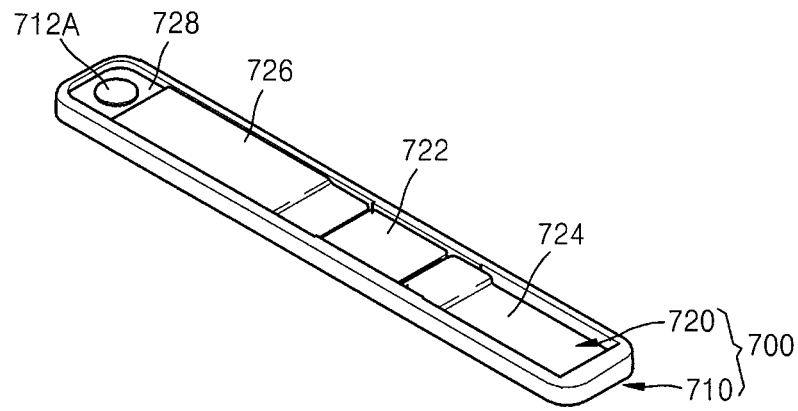
FIG. 3 is a schematic perspective view of a lead tap according to an embodiment of the present invention.

FIG. 3 is a schematic perspective view of the lead tap 700 according to an embodiment of the present invention. Referring to FIGS. 2 and 3, the lead tap 700 includes an insulation cover 710 and a thermal cut-off device assembly (or an overheating block device assembly) 720.

The insulation cover 710 supports the thermal cut-off device assembly 720, and is formed of an electrical insulation material, for example, a synthetic resin such as polycarbonate, polypropylene, or polyvinyl chloride.

A boss unit 712 (refer to FIG. 4) of the insulation cover 710 is inserted into (or protrudes through) a hole 729 formed in the thermal cut-off device assembly 720 so that the insulation cover 710 may be stably combined with (e.g., attached to) the thermal cut-off device assembly 720. An edge of the boss unit 712 is formed such that it is larger than an opening of (or larger than the diameter of) the hole 729 of the thermal cut-off device assembly 720.

The thermal cut-off device assembly 720 includes a thermal cut-off device 722, a first lead 724, a second lead 726, and a combining unit 728.

The thermal cut-off device (or overheating block device) 722 cuts off power when the temperature of the battery pack 10 is increased beyond a suitable (e.g., a predetermined) level. A thermistor that has a positive thermal coefficient may be used as the thermal cut-off device 722. Also, the thermal cut-off device 722 may be a thermal cut-off fuse (or overheating block fuse).

The first lead 724 may couple (e.g., electrically connect) the thermal cut-off device 722 to the negative terminal 220 of the battery cell 200. The first lead 724 may be arranged such that it is exposed through a lower surface of the insulation cover 710 so that the first lead 724 may be coupled (e.g., connected) to the negative terminal 220 of the battery cell 200.

The second lead 726 may couple (e.g., electrically connect) the thermal cut-off device 722 to the lead plate 300. The second lead 726 may be coupled (e.g., connected) to the lead plate 300 by welding. That is, the negative terminal 220 of the battery cell 200 may be coupled (e.g., electrically connected) to the lead plate 300 through the first lead 724, the thermal cut-off device 722, and the second lead 726 of the thermal cut-off device assembly 720. Accordingly, since the thermal cut-off device 722 cuts-off power (e.g., stops the flow of current) when the temperature of the battery cell 200 is increased beyond a suitable (e.g., a predetermined) level, additional overheating of the battery cell 200 may be blocked (e.g., immediately and effectively blocked).

Figure 6:
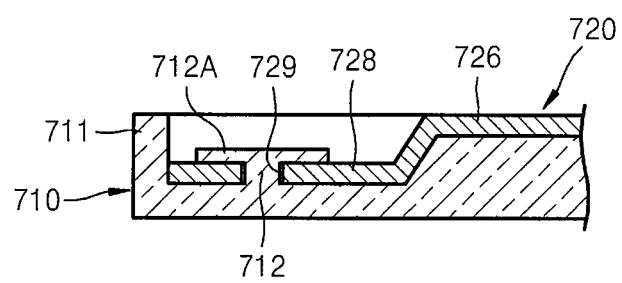
FIG. 6 is a schematic cross-sectional view of a portion of the lead tap of FIG. 3.

The combining unit 728 may extend from the second lead 726 and may include a hole (or opening) 729. FIG. 6 is a schematic cross-sectional view of the insulation cover 710 and the combining unit 728 of the thermal cut-off device assembly 720. Referring to FIG. 6, the boss unit 712 of the insulation cover 710 is inserted into the hole 729 of the combining unit 728. The size of an edge unit 712A of the boss unit 712 of the insulation cover 710 is formed to be greater than the size of an opening of the hole 729 of the combining unit 728 so that the boss unit 712 may not fall out from the hole 729 of the combining unit 728. Accordingly, after the edge unit 712A of the boss unit 712 is formed, the insulation cover 710 and the thermal cut-off device assembly 720 are securely attached to each other.

The lead plate 300 may be formed to couple (e.g., connect) the battery cells 200 in series or parallel. The lead plate 300 includes a first connection unit 310 that is coupled (e.g., electrically connected) to the positive terminal 210 of the battery cell 200 and a second connection unit 320 that is coupled (e.g., electrically connected) to the second lead 726 of the lead tap 700 (which is connected to the negative terminal 220 of the battery cell 200). The connection of the first connection unit 310 of the lead plate 300 to the positive terminal 210 of the battery cell 200, and the connection of the second connection unit 320 of the lead plate 300 to the second lead 726 of the lead tap 700 may be achieved by welding.

The lead plate 300 (which includes the first connection unit 310 and the second connection unit 320) may include a conductive plate that is formed of a conductive material and an insulating film that surrounds portions of the conductive plate except for the first connection unit 310 and the second connection unit 320.

A method of manufacturing the lead tap 700 will now be described.

The method of manufacturing the lead tap 700 according one or more embodiments of the present invention includes: preparing the insulation cover 710; preparing the thermal cut-off device assembly 720; disposing the thermal cut-off device assembly 720 on the insulation cover 710; and thermal-pressing the boss unit 712 of the insulation cover 710.

The preparing of the insulation cover 710 includes preparing the insulation cover 710 formed of an electrical insulating material that includes the boss unit 712.

Figure 4:
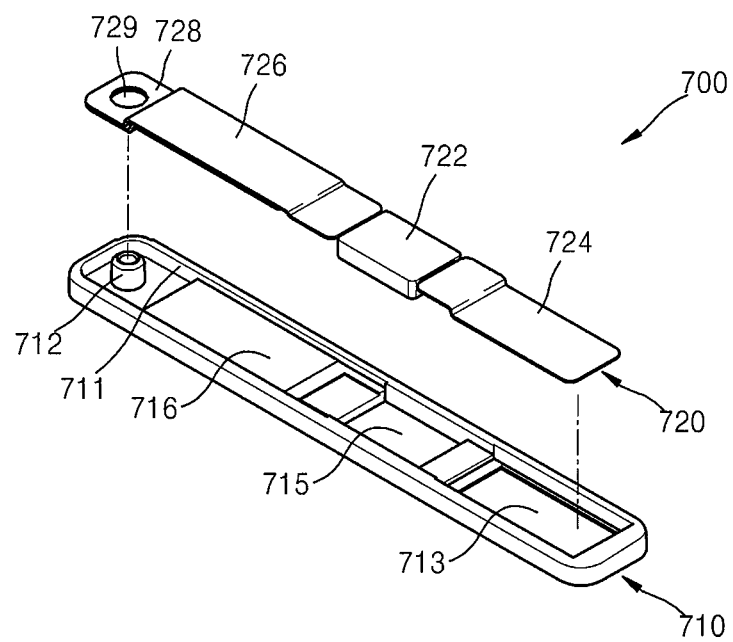
FIGS. 4 and 5 are schematic perspective views showing portions of manufacturing the lead tap of FIG. 3.

FIG. 4 is a schematic exploded perspective view showing the insulation cover 710 and the thermal cut-off device assembly 720. Referring to FIG. 4, the insulation cover 710 includes a first opening (or first through hole) 713 into which the first lead 724 of the thermal cut-off device assembly 720 is inserted, a second opening (or second through hole) 715 into which the thermal cut-off device 722 of the thermal cut-off device assembly 720 is inserted, a second lead seating unit 716 on which the second lead 726 of the thermal cut-off device assembly 720 is seated, and the boss unit 712, which is inserted into the hole 729 of the combining unit 728 of the thermal cut-off device assembly 720. Also, the insulation cover 710 may include a sidewall 711 that surrounds at least a portion of a periphery (e.g., a circumference) of the thermal cut-off device assembly 720 to limit relative movement of the thermal cut-off device assembly 720 mounted thereon.

The preparing of the thermal cut-off device assembly 720 includes preparing the thermal cut-off device 722, preparing the first lead 724 and the second lead 726 on opposite ends of the thermal cut-off device 722, and forming the hole 729 into which the boss unit 712 of the insulation cover 710 is to be inserted.

The disposing of the thermal cut-off device assembly 720 on the insulation cover 710 includes combining (or attaching) the thermal cut-off device assembly 720 with the insulation cover 710, on the insulation cover 710. In the current operation, the boss unit 712 of the insulation cover 710 is inserted into the hole 729 of the combining unit 728 of the thermal cut-off device assembly 720. Here, the edge 712A of the boss unit 712 protrudes upwards from an upper surface of the thermal cut-off device assembly 720.

Also, when the thermal cut-off device assembly 720 is combined with the insulation cover 710, the first lead 724 of the thermal cut-off device 722 is exposed on a lower surface of the insulation cover 710 through the first opening 713 of the insulation cover 710 so that it may be coupled (e.g., connected) to the negative terminal 220 of the battery cell 200. Also, the thermal cut-off device 722 is exposed on the lower surface of the insulation cover 710 through the second opening 715 of the insulation cover 710 so that it may be coupled (e.g., thermally coupled or connected) to the battery cell 200. Therefore, the thermal cut-off device 722 is directly affected by heat generated from the battery cell 200. Accordingly, the thermal cut-off device 722 may sensitively react with the heat generated from the battery cell 200.

Figure 5:
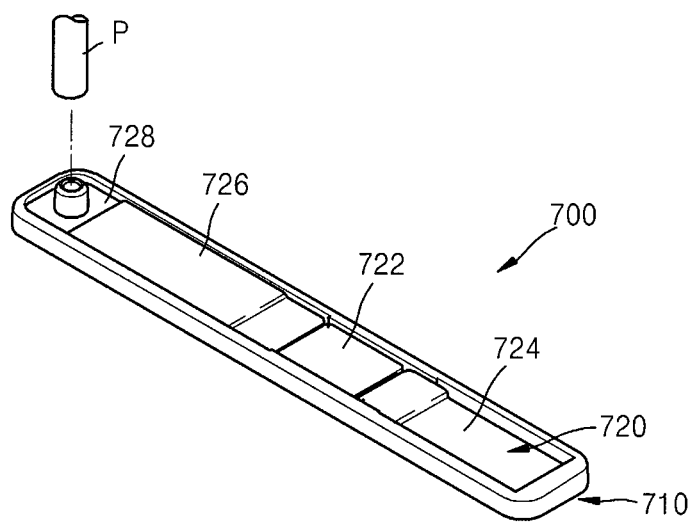

The thermal-pressing of the boss unit 712 of the insulation cover 710 includes thermal-fusion splicing the boss unit 712 of the insulation cover 710 (which protrudes from the thermal cut-off device assembly 720) by using a thermal-press machine P as shown in FIG. 5. Through the process described above, the boss unit 712 of the insulation cover 710 is heated, temporarily melted, and fused with the combining unit 728 of the thermal cut-off device assembly 720. Accordingly, as depicted in FIG. 6, the edge unit 712A of the boss unit 712 is spread (e.g., the edge of the boss unit 712 is formed to be larger than the hole 729 of the thermal cut-off device assembly 720). Accordingly, the thermal cut-off device assembly 720 is securely attached to the insulation cover 710 (e.g., falling out of the thermal cut-off device assembly 720 from the insulation cover 710 may be effectively prevented).

A method of manufacturing the lead tap 700 by using an insert molding method has been tested. However, the method of manufacturing the lead tap 700 according to the present invention is simpler, more rapid, and more economical in material costs when compared to the insert molding method.

It should be understood that the exemplary embodiments described herein should be considered in a descriptive sense only and not for purposes of limitation. Descriptions of features or aspects within each embodiment should be considered as available for other similar features or aspects in other embodiments. It will be understood by those of ordinary skill in the art that various changes in form and details may be made to the described embodiments without departing from the spirit and scope of the present invention as defined by the appended claims and equivalents thereof.

What is claimed is:

1. A lead tap comprising:
an insulation cover comprising an electrical insulating material and a boss unit which protrudes from an upper surface of the insulation cover, the insulation cover having a second opening; and
a thermal cut-off device assembly comprising:
a thermal cut-off device exposed at a lower surface of the insulation cover by the second opening, the thermal cut-off device having a thickness that is less than a height of the insulation cover such that a peripheral surface of the thermal cut-off device is entirely contained within the insulation cover; and
a first lead and a second lead that are coupled to the thermal cut-off device, the thermal cut-off device assembly having a hole through which a portion of the boss unit of the insulation cover protrudes,
wherein the boss unit of the insulation cover comprises an edge unit that is larger than an opening of the hole of the thermal cut-off device assembly to secure the insulation cover to the thermal cut-off device assembly.

2. The lead tap of claim 1,
wherein the thermal cut-off device assembly has a length and a width, the length being greater than the width,
wherein the insulation cover has a first opening having a first width, the first opening extending through the insulation cover, and
wherein the first lead of the thermal cut-off device assembly has a second width, the first width being greater than the second width such that the first lead is exposed at the lower surface of the insulation cover by the first opening.

3. The lead tap of claim 1,
wherein the hole of the thermal cut-off device assembly is located at a combining unit that extends from the second lead.

4. The lead tap of claim 1,
wherein the insulation cover comprises a sidewall that covers at least a portion of a periphery of the thermal cut-off device assembly.

5. A battery pack comprising:
a plurality of battery cells comprising terminals; and
a plurality of lead taps coupled with the terminals of the battery cells,
wherein a lead tap of the lead taps comprises:
an insulation cover comprising an electrical insulating material and a boss unit which protrudes from an upper surface of the insulation cover, the insulation cover having an opening; and
a thermal cut-off device assembly comprising:
a thermal cut-off device exposed at a lower surface of the insulation cover by the opening, the thermal cut-off device having a thickness that is less than a height of the insulation cover such that a peripheral surface of the thermal cut-off device is entirely contained within the insulation cover; and
a first lead and a second lead that are coupled to the thermal cut-off device, the thermal cut-off device assembly having a hole through which a portion of the boss unit of the insulation cover protrudes,
wherein the boss unit of the insulation cover comprises an edge unit that is larger than an opening of the hole of the thermal cut-off device assembly to secure the insulation cover to the thermal cut-off device assembly.

6. The battery pack of claim 5, further comprising:
a lead plate comprising a first connection unit and a second connection unit,
wherein the second lead of the lead tap is directly coupled to the second connection unit, and
wherein the hole of the thermal cut-off device assembly is at a side of the second lead,
and the thermal cut-off device is at an opposite side of the second lead as the hole.

7. A method of manufacturing a lead tap, the method comprising:
preparing an insulation cover comprising an electrical insulating material and a boss unit which protrudes from an upper surface of the insulation cover, the insulation cover having a second opening;
preparing a thermal cut-off device assembly comprising:
a thermal cut-off device; and
a first lead and a second lead that are coupled to the thermal cut-off device, the thermal cut-off device assembly having a hole configured to receive the boss unit of the insulation cover;
arranging the thermal cut-off device assembly on the insulation cover so that the boss unit of the insulation cover is inserted into the hole of the thermal cut-off device assembly and the thermal cut-off device is at the second opening, the thermal cut-off device having a thickness that is less than a height of the insulation cover such that a peripheral surface of the thermal cut-off device is entirely contained within the insulation cover; and
thermal-pressing a portion of the boss unit that protrudes through the hole of the thermal cut-off device assembly to form an edge unit of the boss unit.

8. The method of claim 7,
wherein the thermal cut-off device assembly has a length and a width, the length being greater than the width,
wherein the insulation cover has a first opening having a first width, the first opening extending through the insulation cover,
wherein the first lead of the thermal cut-off device assembly has a second width, the first width being greater than the second width such that the first lead is exposed at a lower surface of the insulation cover by the first opening, and
wherein in the arranging the thermal cut-off device assembly on the insulation cover, the first lead of the thermal cut-off device assembly is arranged to be exposed at the lower surface of the insulation cover through the first opening.

9. The method of claim 7,
wherein the hole of the thermal cut-off device assembly is located at a combining unit that extends from the second lead.

10. The method of claim 7,
wherein the insulation cover comprises a sidewall that covers at least a portion of a periphery of the thermal cut-off device assembly.

* * * * *